July 13, 1926.

T. R. DAVIS 1,592,558

CAST METAL VEHICLE WHEEL

Filed Nov. 8, 1923

INVENTOR
*Thomas R. Davis*
BY
*Chamberlain & Newman*
ATTORNEYS

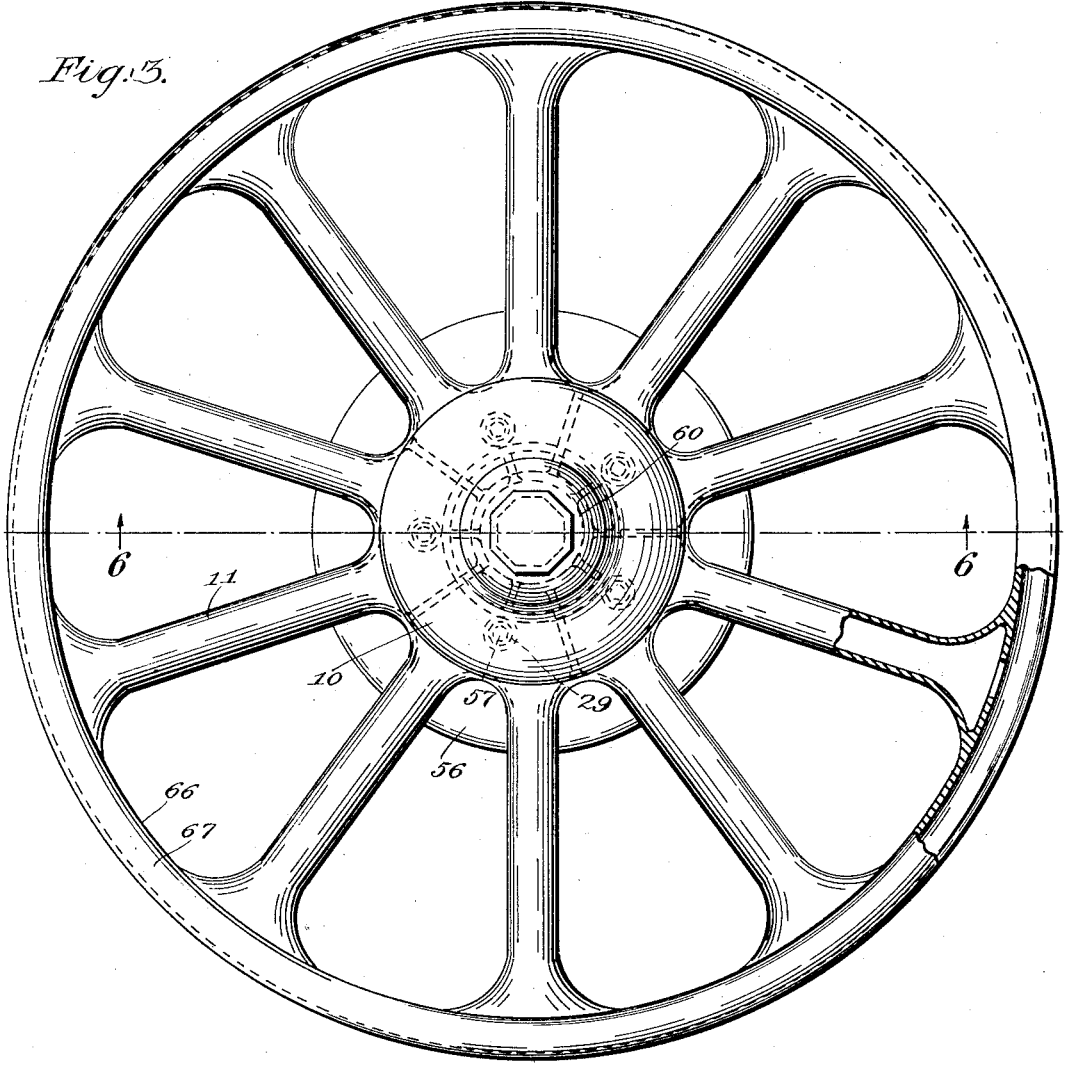
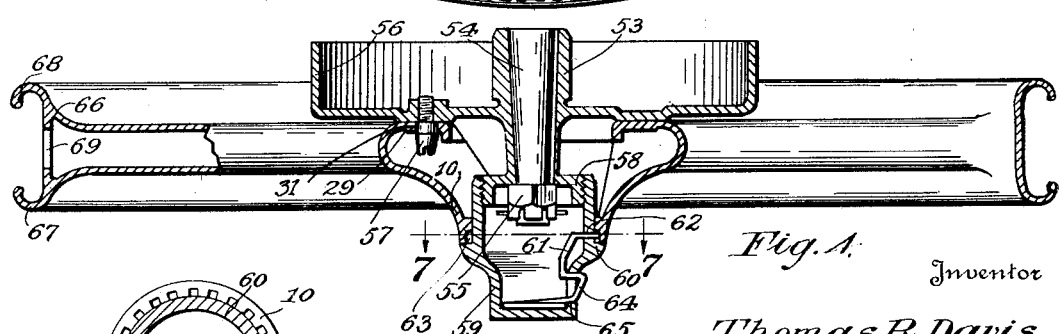
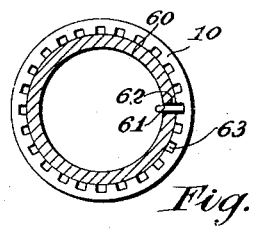

Patented July 13, 1926.

1,592,558

UNITED STATES PATENT OFFICE.

THOMAS R. DAVIS, OF FAIRFIELD, CONNECTICUT, ASSIGNOR TO THE EASTERN MALLEABLE IRON COMPANY, OF BRIDGEPORT, CONNECTICUT, A CORPORATION OF CONNECTICUT.

CAST-METAL VEHICLE WHEEL.

Application filed November 8, 1923. Serial No. 673,499.

This invention relates to an improved cast metal vehicle wheel, and particularly such a wheel in which the spoke and tire carrying rim are of one-piece integral construction, an object being to provide a wheel of this character which will be of sufficient strength to withstand the shocks and strains encountered in use, and which at the same time will be of relatively light weight.

A further object is to provide an improved rim construction adapted for the attachment or removal of tires with facility and by means of which the tires will be supported in a reliable and efficient manner. It is further proposed to provide a wheel in which the tire mounting rim is supported directly by the spokes, there being no felly, such as heretofore provided.

The wheel according to my invention is of the demountable type, and to this end it is a further object to provide a hub construction enabling the expeditious attachment and removal of the wheel from the hub, and which will furthermore form a reliable connection with the hub and wheel, so that in the case of the rear or driven wheels a positive driving connection is provided, while the front wheels will be supported in a manner to rotate freely.

Still another object is to provide a type of wheel which may be used interchangeably on either the front or rear axles.

With the above and other objects in view, embodiments of the invention are shown in the accompanying drawings, and these embodiments will be hereinafter more fully described with reference thereto, and the invention will be finally pointed out in the claim.

In the drawings:

Fig. 3 is a front plan view of the wheel according to a still further modified form, and adapted to the rear brake-drum carrying axle of an automobile;

Fig. 4 is a transverse sectional view thereof, taken along the line 6—6 of Fig. 3;

Fig. 5 is a sectional end view of the hub lock employed.

Similar reference characters indicate corresponding parts throughout the several figures of the drawings.

Figure 1:
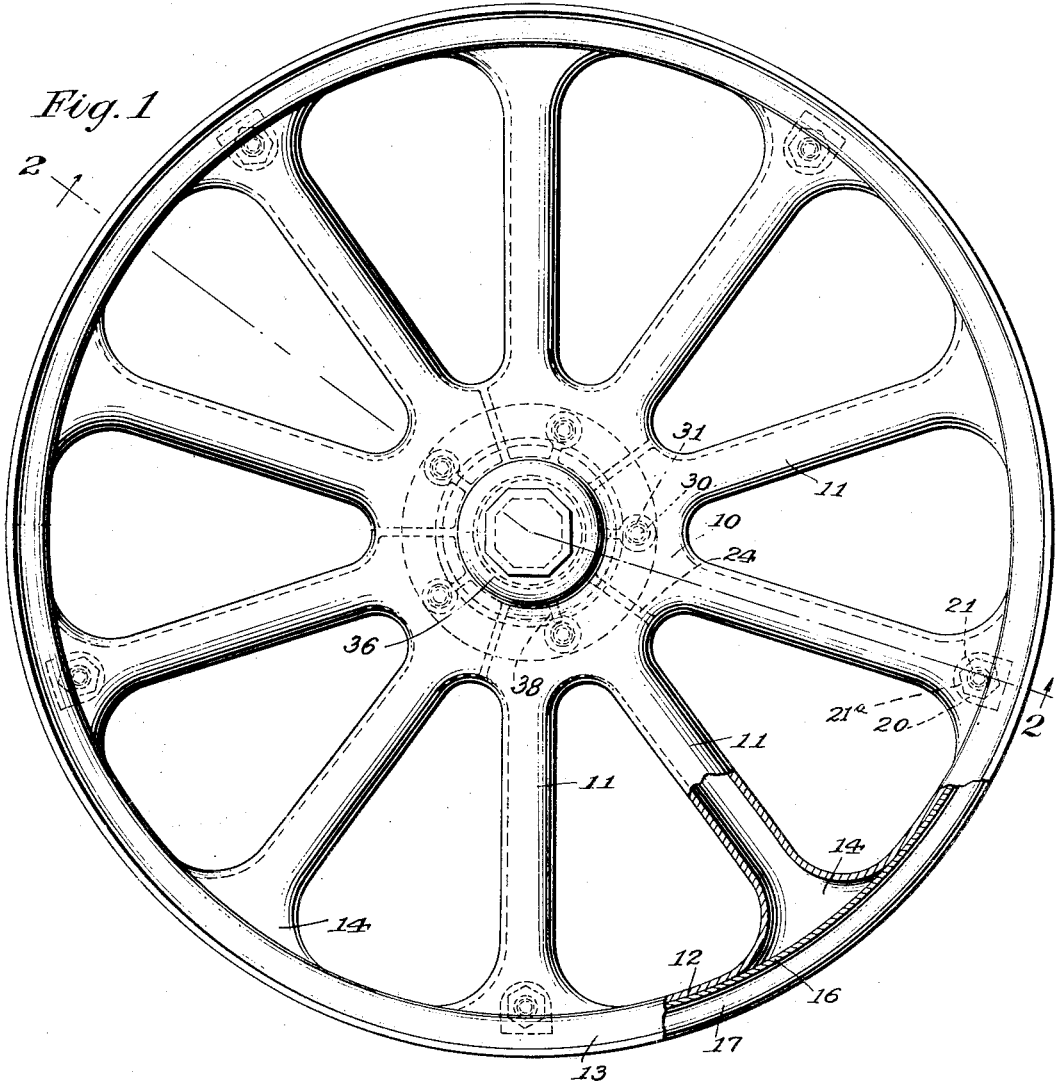
Fig. 1 is a front plan view of a wheel according to one embodiment of the invention, and shown adapted to the front axle spindle of an automobile.
Figure 2:
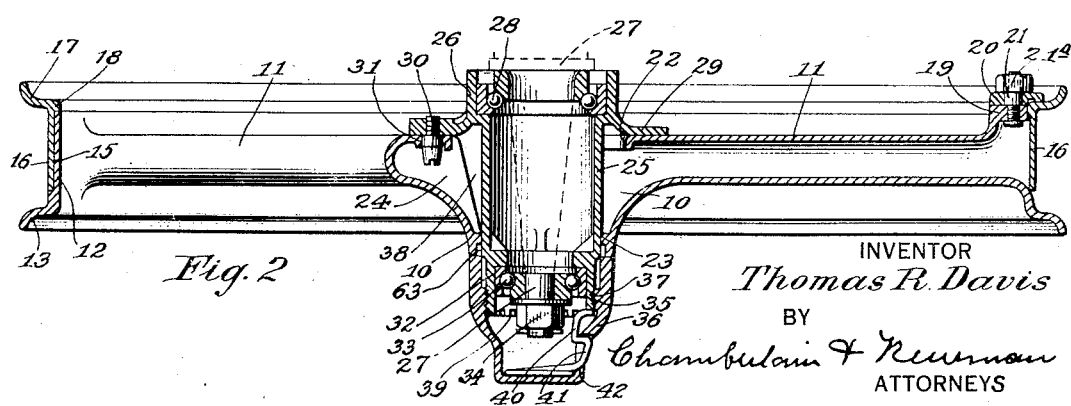
Fig. 2 is a transverse sectional view thereof, taken along the line 2—2 of Fig. 1.

Referring to the drawings, and more particularly to Figs. 1 and 2 thereof, the embodiment of the invention shown therein comprises an annular hollow hub engaging portion 10, provided with hollow spokes 11 radiating therefrom, and a tire supporting rim 12, provided at its forward edge with a circumferential flange 13, the ends of the spokes being flared, as at 14, at their point of connection with the rim. The wheel is not provided with a felly, such as usually employed, but the tire is directly supported on the rim. For this purpose the rim 12 is annularly recessed, as at 15, and an auxiliary tire retaining rim member 16 is engaged thereon, being provided with a circumferential flange 17, which cooperates with the flange 13 to retain the tire, and being shouldered, as at 18, to abut the edge of the rim member 12. The rim member 16, being continuous, closes the ends of the spokes, thereby providing a continuous smooth cylindrical surface for support of the tire.

Certain of the spokes, preferably the alternate ones, are provided on the rear side and adjacent the rim with bosses 19, upon which lugs 20, which project into engagement with the rim flange 17, are secured by means of studs 21 screwed into the bosses and having retaining units 21ª thereon. These studs being at the rear side, the exposed or outer surface of the wheel presents a smooth and continuous surface, which may be easily kept clean and is attractive in appearance.

The hub engaging portion 10 is flat at its rear side, and is provided with an inwardly extending peripheral flange 22, while at its forward side said portion is extended forwardly and provided within its relatively contracted end with an annular inset flange 23. The portion 10 is furthermore provided interiorly with a series of radial reinforcing webs 24.

The hub 25, which is separable from the wheel, is in the form of a hollow cylinder, engaged at its forward end by the flange 23 of the wheel, and provided at its inner end with an enlarged annular recessed portion 26, between which and the inner shouldered end of the axle spindle 27, anti-friction bearings 28 are disposed. The portion 26 is provided with an outwardly extending flange 29 carrying a series of studs 30, engaged in apertures 31 of the rear flat face of the portion 10 of the wheel, and forming a connection between the wheel and hub which causes the two to turn together.

At its forward end the hub is provided with a reduced forwardly projecting annularly recessed portion 32, between which and the forward reduced end of the spindle 27, anti-friction bearings 33 are disposed, and held in place by a nut 34 upon the end of the spindle.

The hub is threaded at its forward end, as at 35, for receiving the hub cap 36, said cap extending rearwardly of its threaded portion 37 into abutment with the forwardly extended end of the hub engaging portion 10, and thereby retaining the wheel snugly upon the hub. Reinforcing webs 38 are provided on the hub, between the cylindrical portion and the flange 29, in alternating relation to the ribs 24 of the portion 10.

In order to prevent relative turning of the cap upon the hub, the latter is provided at its end with a series of notches 39, one of which is engaged by a spring member 40 secured within the hub, and having an exposed portion 41 bent into and projecting outwardly from a slot 42 in the octagonal portion of the hub, and adapted upon engagement of a wrench upon said portion to be depressed inwardly and out of locking engagement with said notches, to thereby permit removal of the cap and dismounting of the wheel.

In Figs. 3 and 4 there is illustrated a modification, in which the hub includes a brake-drum, and is adapted to be driven by the driving axle of the automobile. The wheel itself, as regards the spoke and hub engaging portion is identical to the wheel shown in Figs. 1 and 2, and may be interchangeably mounted on either the front or rear hub structures.

The hub structure comprises a tubular hub portion 53, keyed to the tapered driving axle 54, and secured thereto by a nut 55, and being provided with an integral brake-drum 56 having spaced studs 57 secured thereto and adapted to be engaged in the apertures 29 of the wheel to form a driving connection. At its forward end the hub is enlarged, as at 58, and screw threaded to receive the hub cap 59, an external flange or shoulder 60 being provided intermediately the ends of the cap, which abuts the projected forward end of the portion 10 of the wheel, to retain the same upon the hub.

In order to prevent relative rotation of the hub cap, a spring member 61 is secured within the hub, having its end extended through an opening 62 in the hub and engaging one of a series of notches 63 provided in the end of the portion 10 of the wheel, and having a portion 64 bent into and projecting outwardly from a slot 65 in the octagonal portion of the hub cap, so that as a wrench is engaged thereon, it will depress and disconnect the spring member from the notches, to thereby permit removal of the hub and the removal of the wheel. The demountable wheel, as shown in Figs. 1 and 2, being identical with that shown in Fig. 4, is also provided with the notches 63, but these only come into use when the wheel is mounted upon the brake-drum type of hub.

In Figs. 3 and 4 there is furthermore illustrated a modified type of rim, comprising a cylindrical portion 66 and integral tire retaining flanges 67 and 68 at its front and rear edges, holes 69 being provided in the portion 66 in line with the opening through the spokes.

The wheel according to my invention, is of extremely light construction, due in part to the elimination of a felly, the tire carrying rim being directly connected to the spoke ends. The dismounting or attachment of the wheel may be effected with facility, and in use the wheel is highly efficient and of such strength as to effectually withstand the shocks and strains encountered.

I have illustrated and described preferred and satisfactory embodiments of the invention, but it will be obvious that changes may be made therein, within the spirit and scope thereof, as defined in the appended claim.

Having thus described my invention, what I claim and desire to secure by Letters Patent is:

In a wheel, a hub, a flange formed integral with the hub, a detachable wheel mounted on said hub, said wheel including a hollow annular hub engaging portion having a part abutting the flange, said flange and hub engaging portion having registering openings therethrough, means arranged in said openings to hold the parts against relative rotation, an inset flange on the hub engaging portion and spaced from the hub flange and supported adjacent the outer end of the hub, and means secured to the hub and retaining the wheel member thereon with the annular hub portion in contact with the flange, and said means engaged by and supporting said inset flange.

Signed at Bridgeport in the county of Fairfield and State of Connecticut this 7th day of November, A. D., 1923.

THOMAS R. DAVIS.